March 4, 1969   CARL-ERIK GRANQVIST   3,430,500
ROTATION-RESPONSIVE VOLTAGE SOURCE Filed Feb. 3, 1966

INVENTOR
CARL-ERIK GRANQVIST

BY *Larson and Taylor*

ATTORNEYS

United States Patent Office 3,430,500
Patented Mar. 4, 1969

3,430,500
ROTATION-RESPONSIVE VOLTAGE SOURCE
Carl-Erik Granqvist, Lidingo, Sweden, assignor to AGA Aktiebolag, Lidingo, Sweden, a corporation of Sweden
Continuation-in-part of application Ser. No. 247,723, Dec. 27, 1962. This application Feb. 3, 1966, Ser. No. 524,756
Claims priority, application Sweden, Jan. 22, 1962, 702/62
U.S. Cl. 74—5.4      6 Claims
Int. Cl. G01c *19/54, 19/28*

ABSTRACT OF THE DISCLOSURE

A speed control arrangement for a slowly rotating member includes a toothed wheel and cooperating pickoff for producing voltages in phase quadrature. A constant carrier frequency is modulated by each of the pickoffs with a frequency proportional to the speed of rotation of the wheel. The modulated signals are further individually modulated by the phase quadrature outputs of a further reference frequency source. The two twice modulated carrier frequency components are combined to produce a control signal indicative of both the speed and direction of rotation of the wheel.

---

The present invention is a continuation-in-part of the copending application by the same named applicant filed Dec. 27, 1962 and having Ser. No. 247,723 and now abandoned.

The present invention relates to an arrangement for indicating the rotative movement of a slowly rotating member by reference to a generated voltage responsive to the speed and direction of rotation of the rotating member.

The problem solved by the present invention is that which arises when the speed of rotation as such and particularly changes in the speed of rotation by reference to which a controlling function is to be performed are too slow to generate by conventional means a signal which is capable of inducing a sensitive and immediate response.

This problem arises, for instance, in inertial navigation and guidance systems in which relatively very small changes in the apparent speed of precession of a precessing gyroscope are to be used for purposes of control.

For overcoming this difficulty the present invention proposes an arrangement for control by reference to the speed of a slowly rotating member which comprises modulating a constant carrier frequency in phase quadrature, in two pick-offs cooperating with the rotating member, with a frequency that is proportional to the speed of rotation of said rotating member, impressing a second constant modulating frequency from a second frequency source likewise in phase quadrature upon each of said modulated carrier frequency components in a separate modulator and combining the two twice modulated carrier frequency components into a common output from the two modulators to provide a control signal indicative of both the speed and direction of rotation of the rotating member.

The apparatus for such control will essentially comprise a rotatable member provided with teeth for cooperation with two pickoffs, a modulator associated with each pickoff to which the said carrier frequency modulated by the cooperation of the teeth of the rotating member with the two pickoffs in phase quadrature is applied, a second source of constant frequency, means for splitting said second constant frequency in phase quadrature for application of each frequency component to one of the modulators and means for combining the output signals from both modulators.

The advantage this method and the described apparatus afford and further developments of the invention will be more readily understood from the following particular description of embodiments of the invention shown in the accompanying drawings in which.

Figure 1:
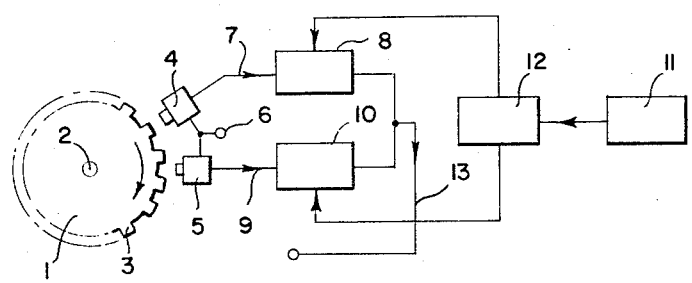
FIG. 1 is a block diagram illustrating the principle underlying the present invention.

With reference first to FIG. 1 there is illustrated a rotating member 1 with teeth 3 mounted on a shaft 2. The teeth 3 of this wheel 1 cooperate with two pickoffs 4 and 5 to which a carrier frequency, say of 400 c./s., is applied via a common terminal 6. The pickoffs may be of a known type with an E-shaped core, the carrier frequency from terminal 6 being taken through the windings on the two outer limbs and the modulated carrier frequency being derived from the winding on the center limb of each pickoff.

The output from pickoff 4 is applied via 7 to a modulator 8, whereas the output from pickoff 5 is applied via 9 to a second modulator 10. A constant modulating frequency is supplied by an oscillator 11. This oscillator may be crystal-controlled and its output frequency adjustably variable within limits. Moreover, the oscillator frequency may be demultiplied in a manner known in the art and not shown in the drawing. This frequency is taken to a phase splitter 12 which divides the possibly demultiplied oscillator frequency into a sine and cosine component. The two output frequencies from the sine-cosine phase splitter are applied as modulating frequencies to the two modulators 8 and 10 respectively as will be understood from the drawing.

Let the angular frequency of the modulation impressed on the carrier frequency by the rotation of the toothed wheel 3 be $\omega_1$ and let that of the carrier frequency itself be $\omega_2$. The input applied to modulator 8 will then have the form $\sin \omega_1 t \cdot \cos \omega_2 t$, whereas that applied to modulator 10 will be $\cos \omega_1 t \cdot \cos \omega_2 t$. Let it be further assumed that the modulating frequency components delivered by the phase splitter 12 to the modulators 8 and 10 are $\cos \omega_3 t$ and $\sin \omega_3 t$ respectively. The combined outputs from the two modulators in line 13 must then be $$\sin \omega_1 t \cdot \cos \omega_2 t \cdot \cos \omega_3 t \pm \cos \omega_1 t \cdot \cos \omega_2 t \cdot \sin \omega_3 t$$
$$= \cos \omega_2 t \cdot \sin (\omega_1 \pm \omega_3) t \quad (1)$$

This equation shows that the application of the modulating frequency $\omega_3$ has the same effect as if the angular frequency $\omega_1$ due to the rotation of the toothed wheel had been changed, or as if rotary motion had been imparted to the two pickoffs 4 and 5 in relation to the toothed wheel about the wheel axis, the effect being the same as if the slow speed of rotation of the toothed wheel had been increased by a given amount.

This output voltage can now be utilized to determine the speed and direction of rotation of the toothed wheel 1 by comparing it in conventional manner with a suitably selected reference frequency. In view of the fact that $\omega_1$ has been subjected to an apparent change by the amount of $\omega_3$ the reference frequency must be correspondingly changed although this change need not be produced by modulation in modulators corresponding to 8 and 10 but may be achieved by the suitable division or multiplication of the reference frequency.

The described system is particularly suitable for the generation of a feedback signal to maintain the speed of rotation of the toothed wheel 1 constant, and in a preferred application of the described system this possibility is utilized for the stabilization of a gyro-platform carrying two gyroscopes which precess at a constant rate in an inertial reference frame. The construction of such gyroscopes has been described, for instance, in the specification of British Patent No. 972,762.

In order to facilitate understanding of the proposed arrangement, it may be assumed that $\omega_3$ is so chosen that it is equal to $\omega_1$, and hence corresponds to a given speed of wheel 1, and that the phase difference between the two frequencies $\omega_1$ and $\omega_3$ is $\alpha$. The output signal appearing in line 13 will then have the form $$\cos \omega_2 t . \sin \alpha (\omega_1 t - \omega_1 t + \alpha) = \cos \omega_2 t . \sin \alpha \quad \ldots \quad (2)$$

Any tendency of the wheel 1 to change its speed of rotation will then immediately cause a change in angle $\alpha$. As will be understood from the expression on the right in Equation 2 the output signal in line 13 will therefore be the carrier frequency $\omega_2$ modulated by $\sin \alpha$.

Figure 6:
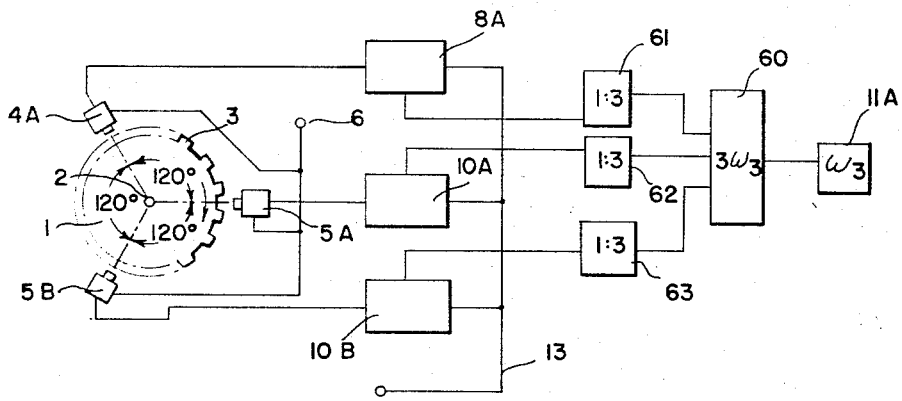
FIG. 6 is a block diagram of a circuit which is a further modification of the circuit of FIG. 1.

It may also be mentioned that it is advisable to ensure that the two output voltages from the phase splitter 12 are purely sinusoidal to prevent the generation of harmonics in the output 13. Alternatively, the generation of uneven harmonics may be suppressed, as shown in FIG. 6 by providing three pickoffs 4A, 5A and 5B disposed at angular intervals of 120° around the circumference of wheel 1, by connecting each pickoff to a respective modulator 8A, 10A and 10B of the kind illustrated in FIG. 1, and by then combining the three modulator outputs for comparison with a reference frequency from a reference oscillator 11A which has been subjected to phase splitting in a ring counter 60 and division by a factor of 3 in frequency dividers 61, 62 and 63.

This output signal at line 13 is useful since it can be used for indicating the phase position of the wheel 1 when it is assumed that the alternating voltage produced in the oscillator 11 has a fixed frequency $\omega_3$. An alternating output voltage having the form $\cos \omega_2 t . \sin \alpha$ has accordingly an amplitude which is proportional to the phase angle $\alpha$ between the alternating voltage produced in the pickups cooperating with the rotatable wheel 1 and the alternating reference voltage produced in the oscillator 11. If necessary, this output signal from the modulator can be used for correcting the rotating speed of the rotatable member so that the phase angle $\alpha$ becomes zero, for instance, by means of torque motors in accordance with the embodiment shown in FIG. 2.

Figure 2:
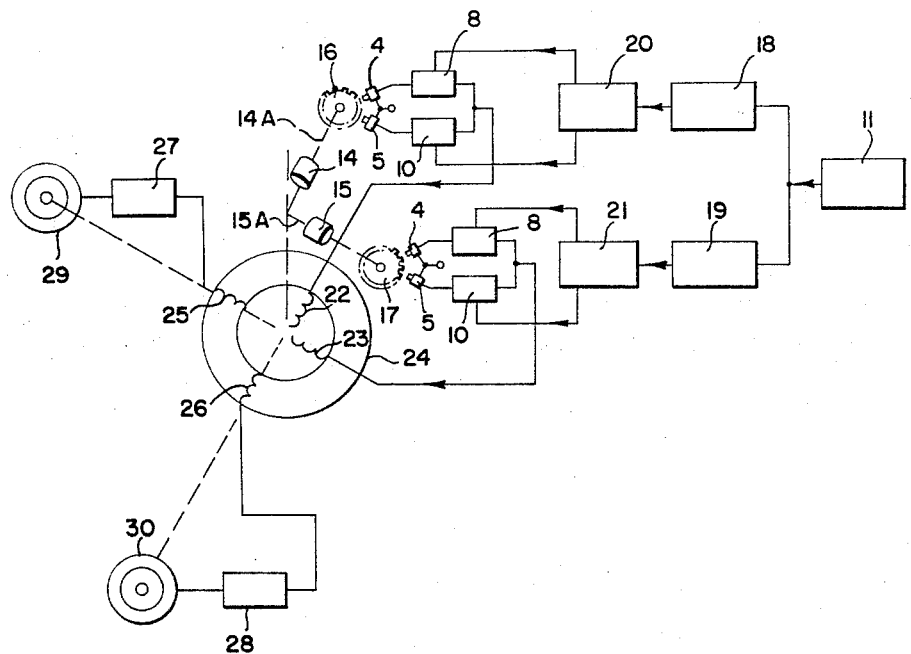
FIG. 2 is an application of the invention to the control of a stable platform in a system of inertial navigation and FIG. 3 is a top plan view of the arrangement indicated schematically in FIG. 2.
Figure 3:
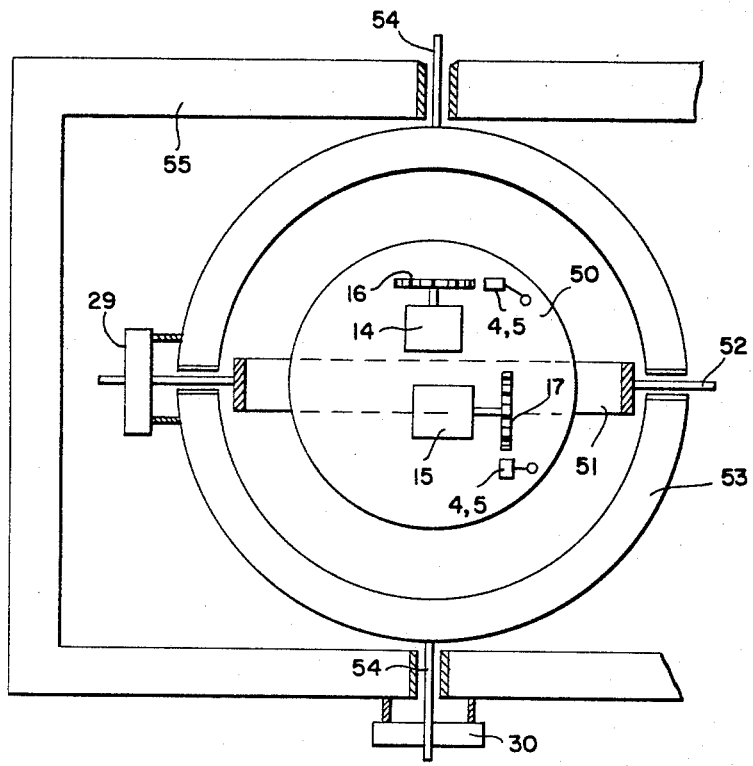
Figure 4:
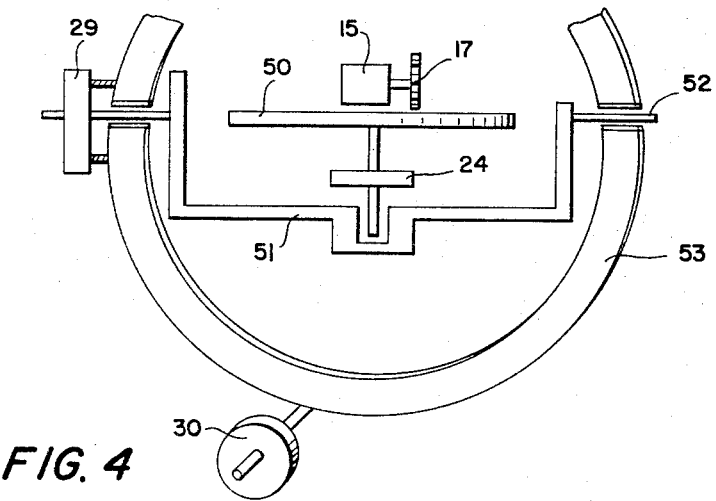
FIG. 4 is an elevational view of the inner gimbal and platform of the arrangement of FIG. 3 with the outer gimbal and torque motor being shown in perspective.

An embodiment of the proposed system for the stabilization of a gyro platform is illustrated in FIGURES 2–4. In these FIGURES 14 and 15 represent two velocity gyroscopes both precessing at the same constant speed about two relatively perpendicular axes 14A and 15A respectively and mounted on a platform 50. The precessing gimbal of gyro 14 drives a gear 16, and gyro 15 drives a gear 17, so that the two gears rotate at the constant speed of precession of the two gyros.

The gyroscopes are so positioned on the platform 50 that their shafts 14A and 15A, upon which the gears 16 and 17 respectively are mounted, are perpendicular to each other.

The platform 50 is carried by an inner gimbal 51 which in its turn is rotatably mounted by bearings 52 in an outer gimbal 53. Also, this outer gimbal 53 is rotatably mounted by bearings 54 in a fixed frame 55.

Each gear cooperates with two pickoffs 4 and 5 likewise mounted on the platform 50, in the manner shown in FIG. 1, the output of each pickoff being modulated in a modulator 8 and 10 respectively. This modulation frequency is derived from a crystal-controlled oscillator 11 providing a frequency which is first demultiplied in frequency dividers 18 and 19 respectively and then split into sine and cosine components in the two circuits 20 and 21. These sine and cosine components are applied to the modulating inputs of the four modulators, and the output signals from each pair of modulators are combined and taken to two windings 22 and 23 on the rotor of a sine-cosine divider 24. The coils 25 and 26 of the stator of the sine-cosine divider 24 are connected through amplifiers 27 and 28 to two servo motors 29 and 30 which are at the same time fed with the same frequency as that of the carrier applied to the pickoffs, i.e. $\omega_2$, which may be 400 c./s.

The sine-cosine splitter 24 is inserted between the platform 50 and the inner gimbal 51 in such a way that the rotor of this phase splitter is connected with the platform 50 and the stator of the phase splitter is connected with the inner gimbal 51. Further, the torque motor 29 is mounted so as to apply a torque on the inner gimbal 51, while the torque motor 30 is mounted so as to apply a torque on the outer gimbal 53. Thus, the rotor of this torque motor 29 can be connected with the inner gimbal 51 and its stator with the outer gimbal 53.

When the system according to FIGURES 2–4 is in operation, it is assumed that the gears 16 and 17 are rotating with the same constant speed, so that the modulating frequency $\omega_1$ is obtained from the pickoffs 4 and 5 cooperating with these gears. In the steady state, $\omega_1 = \omega_3$ which means that no correcting voltage is applied to the torque motors 29 and 30. If, however, the platform 50 is tilted about an axis, for instance parallel with the shafts of the bearings 52, the pickoffs 4 and 5 cooperating with the gear 17 will indicate a phase displacement $\alpha$ and a corresponding control voltage will be produced which is applied to the torque motor 29 in such a way that the phase displacement angle $\alpha$ becomes zero. If the tilting of the platform 50 takes place about the axis mentioned, the pickoffs 4 and 5 cooperating with the gear 16 will not react. If, however, the tilting takes place about any other axis, a control signal is produced in the pickoffs cooperating with both gears 16 and 17, and in order to ascertain that a proper control voltage is applied to the torque motors 29 and 30, the sine-cosine phase splitter 24 is inserted between the platform 50 and the inner gimbal 51. Thus, a certain mechanical coupling is present between the sine-cosine phase splitter, the torque motors and the gears.

Figure 5:
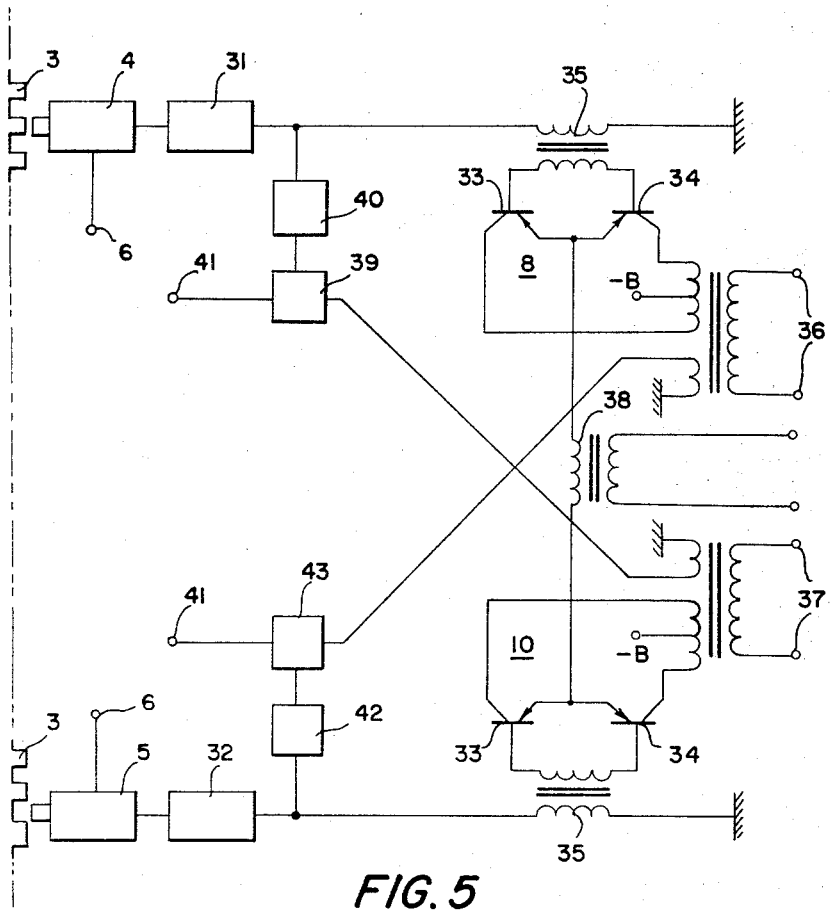
FIG. 5 illustrates a further development and refinement of the proposed system.

An embodiment of the invention in which the correcting signal for the stabilization of the gyro platform depends not only upon the change in the apparent speed of precession of the gyros on the platform but also upon the rate at which such a change takes place, and which therefore provides a more sensitive type of control, is illustrated in FIG. 5.

For the sake of convenience and clarity the circumference of one of the wheels 1 is here shown developed in the plane of the paper, the teeth of the wheel being indicated at 3. As in the previous embodiments two pickoffs 4 and 5 cooperate with the teeth, the carrier frequency $\omega_2$ being applied to the pickoffs at terminal 6. The pickoff outputs are amplified in amplifiers 31 and 32 respectively and the amplifier outputs are taken to two modulators generally indicated, as before, by reference numerals 8 and 10. It will be seen from the more detailed representation of the modulators in FIG. 3 that they are of the balanced type, each comprising a pair of transistors 33 and 34, the bases of the transistors being interconnected through the secondary winding of an input transformer 35. As explained with reference to the preceding embodiments there is applied to the primary of the input transformer 35 of modulator 8 an oscillation represented by $\sin \omega_1 t . \cos \omega_2 t$ and to the primary of input transformer 35 of modulator 10 an oscillation represented by $\cos \omega_1 t . \cos \omega_2 t$. Moreover, it is assumed that a modulating voltage $\cos(\omega_1 t - \alpha)$ is applied to the input terminals 36 of a second input transformer of modulator 8 so that the output from this modulator will be $\sin \omega_1 t . \cos \omega_2 t . \cos(\omega_1 t - \alpha)$. Analogously a voltage represented by sin $(\omega_1 t - \alpha)$ is applied to the terminals 37 of the second input transformer of modulator 10, so that the output from this modulator will be $$\cos \omega_1 t . \cos \omega_2 t . \sin (\omega_1 t - \alpha)$$

The combination of these two output voltages in the primary 38 of the common output transformer provides a voltage $\cos \omega_2 t . \sin \alpha$.

At the same time the output voltage from each amplifier 31 and 32 is taken through an amplitude limiter 40 and 42 respectively to a synchronous demodulator 39 and 43 respectively. The carrier frequency $\omega_2$ is applied via terminal 41 to each of these demodulators 39 and 43 so that the voltage appearing in the output of demodulator 39 will have the form $k . \sin \omega_1 t$ and that form demodulator 43 $k . \cos \omega_1 t$. Each of these two outputs is taken to a short primary winding of the modulating input transformer of that modulator 10 or 8 respectively which is associated with the other pick-off, as will be understood from FIG. 3. The appearance of this voltage in the shorter primary of the modulating input transformer of say modulator 8 induces in the secondary of this transformer an output voltage which is proportional to the rate of change of $k . \cos \omega_1 t$ corresponding to a change of $\alpha$, i.e. which is equal to $-k . d\alpha/dt \sin \omega_1 t$, and which modulates the voltage $\sin \omega_1 t . \cos \omega_2 t$ derived from transformer 35 and produces a modulator output equal to $$-k . d\alpha/dt . \sin {}^2\omega_1 t . \cos \omega_2 t$$

Similarly the signal derived from demodulator 39 has the effect of producing an output voltage from modulator 10 which is equal to $k . d/dt . \cos^2 \omega_1 t . \cos \omega_2 t$. The combination of these two signals in the primary 38 of the common output transformer therefore provides the voltage $$k . d\alpha/dt \cos \omega_2 t . (\sin^2 \omega_1 t + \cos^2 \omega_1 t) = k . d\alpha/dt . \cos \omega_2 t$$

This voltage component must be added to the above mentioned voltage $\cos \omega_2 t . \sin \alpha$ and the total output will therefore be $$\cos \omega_2 t (\sin \alpha + k . d\alpha/dt \quad (3)$$

It will thus be seen that this embodiment differs from that described by reference to FIG. 2 in that the voltage obtained for controlling the servo motors also contains a term which represents the rate of change of the phase position $\alpha$. This has the advantage that a higher rate of change of $\alpha$ will also provide a stronger controlling signal and a correspondingly faster response of the servo motors in reerecting of the gyroscope platform.

It will be understood that this invention is susceptible to modification in order to adapt it to different usages and conditions and, accordingly, it is desired to comprehend such modifications within this invention as may fall within the scope of the appended claims.

What I claim is:

1. An arrangement for producing a voltage indicating the phase position of a rotating member, comprising a means for producing a carrier voltage having a fixed frequency, means for applying said carrier frequency to a first pickoff cooperating with said rotating member for producing a first voltage having the same frequency as the reference frequency and a variable phase relative to the carrier voltage, means for applying said carrier frequency to a second pickoff cooperating with said rotating member for producing a second voltage in phase quadrature to said first voltage, a first modulator being connected to the output of said first pickoff, a second modulator being connected to the output of said second pickoff, a reference oscillator, a phase splitting device being connected to said reference oscillator for producing two additional reference voltages mutually in phase quadrature, means for applying a first of said additional reference voltages to said first modulator, means for applying a second of said additional reference voltages to said second modulator, and means for combining the outputs of said modulators to form a voltage having an amplitude which is indicative of the phase difference between said first voltage and said source reference voltage.

2. An arrangement as claimed in claim 1 and further comprising a sine-cosine phase splitter, means for applying the combined outputs of said modulators to said sine-cosine phase splitter, two torque motors, means for applying the outputs of said sine-cosine phase splitter to said torque motors, and mechanical coupling means connecting said torque motors and said rotating member.

3. An arrangement as claimed in claim 1, and further comprising means for amplitude-limiting, synchronous detecting and differentiating the output of one pickoff and thereupon applying the differentiated voltage to said second modulator; and means for amplitude-limiting, synchronous detecting and differentiating the output of the second pickoff and thereupon applying this differentiated voltage to said first modulator thereby deriving from the outputs of the modulators a signal indicative of the rate of change of the phase position of said rotating member.

4. An arrangement as claimed in claim 1 and further comprising a stable platform, a gyroscope having a precessing gimbal mounted on said platform with said rotating member being driven by said precessing gimbal, a servo motor operatively connected to said platform, and means for feeding the combined output of said modulators to said servo motor to control said platform in response to said output.

5. An arrangement as claimed in claim 1 and further comprising a plurality of more than two pickoffs equally spaced about the periphery of said rotating member to modulate a carrier frequency with a frequency representing the speed of rotation of said rotating member in as many different equiangularly displaced phase positions as there are pickoffs, a plurality of modulators each connected to the corresponding plurality of pickoffs to modulate each phase, and means connected to said modulators for combining the several modulator outputs to provide a control signal.

6. An arrangement as claimed in claim 4 and further comprising a second gyroscope on said platform, said first and second gyroscope having precessing gimbals on axes perpendicular to each other, two pairs of pickoffs cooperating with said precessing gimbals, two pairs of modulators connected to said pickoffs to receive output signals therefrom, a sine-cosine divider having a rotor and a stator and mounted between said platform and its suspension, said rotor being connected to said modulators to receive output signals therefrom, and two servos operatively connected to said platform and receiving output signals from said stator to position said platform in response to said signals.

References Cited

UNITED STATES PATENTS

| 2,730,664 | 1/1956 | Karlson | 318—31 |
| 3,123,818 | 3/1964 | Steele. | |
| 3,304,788 | 2/1967 | Granquist | 74—5.34 |
| 3,308,670 | 3/1967 | Granquist | 74—5.34 |

C. J. HUSAR, *Primary Examiner.*

U.S. Cl. X.R.

74—5.6